United States Patent
Anzures et al.

(10) Patent No.: US 10,033,872 B2
(45) Date of Patent: *Jul. 24, 2018

(54) VOICEMAIL MANAGER FOR PORTABLE MULTIFUNCTION DEVICE

(75) Inventors: Freddy Allen Anzures, San Francisco, CA (US); Greg Christie, San Jose, CA (US); Scott Forstall, Mountain View, CA (US); Gregory Novick, Santa Clara, CA (US); Steven P. Jobs, Palo Alto, CA (US); Imran Chaudhri, San Francisco, CA (US); Stephen O. Lemay, San Francisco, CA (US); Patrick Lee Coffman, Menlo Park, CA (US); Elizabeth Caroline Furches, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 13/172,649

(22) Filed: Jun. 29, 2011

(65) Prior Publication Data

US 2011/0254800 A1    Oct. 20, 2011

Related U.S. Application Data

(63) Continuation of application No. 11/770,720, filed on Jun. 28, 2007, now Pat. No. 7,996,792.
(Continued)

(51) Int. Cl.
*G06F 3/048* (2013.01)
*H04M 3/533* (2006.01)
(Continued)

(52) U.S. Cl.
CPC ...... *H04M 3/53333* (2013.01); *G06F 3/0482* (2013.01); *G06F 3/0488* (2013.01);
(Continued)

(58) Field of Classification Search
CPC .... G06F 3/04883; G06F 3/017; G06F 3/0488; G06F 3/0482; G06F 3/04886;
(Continued)

(56) References Cited

U.S. PATENT DOCUMENTS

| 4,837,798 A | 6/1989 | Cohen et al. |
| 4,935,954 A | 6/1990 | Thompson et al. |

(Continued)

FOREIGN PATENT DOCUMENTS

| CN | 1673939 A | 9/2005 |
| DE | 10 2004 029 203 A1 | 12/2005 |

(Continued)

OTHER PUBLICATIONS

Arons, B., "The Audio-Graphical Interface to a Personal Integrated Telecommunications System," Massachusetts Institute of Technology, Department of Architecture Master Thesis, Jun. 1984, 88 pages.

(Continued)

*Primary Examiner* — Tuyetlien T Tran
(74) *Attorney, Agent, or Firm* — Dentons US LLP

(57) ABSTRACT

A computer-implemented method for management of voicemail messages, performed at a portable electronic device with a touch screen display, includes: displaying a list of voicemail messages; detecting selection by a user of a respective voicemail message in the list; responding to the user selection of the respective voicemail message by initiating playback of the user-selected voicemail message; displaying a progress bar for the user-selected voicemail message, wherein the progress bar indicates the portion of the user-selected voicemail message that has been played; detecting movement of a finger of the user from a first position on the progress bar to a second position on the progress bar; and responding to the detection of the finger (Continued)

movement by restarting playback of the user-selected voice-mail message at a position within the user-selected voice-mail message corresponding substantially to the second position on the progress bar.

30 Claims, 9 Drawing Sheets

Related U.S. Application Data

(60) Provisional application No. 60/879,469, filed on Jan. 8, 2007, provisional application No. 60/879,253, filed on Jan. 7, 2007, provisional application No. 60/883,799, filed on Jan. 7, 2007, provisional application No. 60/824,769, filed on Sep. 6, 2006.

(51) Int. Cl.
G06F 3/0482 (2013.01)
G06F 3/0488 (2013.01)
G11B 27/34 (2006.01)
H04M 1/725 (2006.01)
H04M 1/65 (2006.01)

(52) U.S. Cl.
CPC ...... G06F 3/04883 (2013.01); G06F 3/04886 (2013.01); G11B 27/34 (2013.01); H04M 1/7255 (2013.01); H04M 1/72522 (2013.01); H04M 1/6505 (2013.01); H04M 2203/256 (2013.01); H04M 2250/22 (2013.01)

(58) Field of Classification Search
CPC ......... G06F 3/0481; G06F 2203/04808; G06F 3/0485; G06F 3/04842; G06F 1/1626; H04M 3/53333
USPC ........................................ 715/702, 863, 864
See application file for complete search history.

(56) References Cited

U.S. PATENT DOCUMENTS

| | | | |
|---|---|---|---|
| 4,972,462 A | 11/1990 | Shibata | |
| 5,003,577 A | 3/1991 | Ertz et al. | |
| 5,164,982 A | 11/1992 | Davis | |
| 5,283,818 A | 2/1994 | Klausner et al. | |
| 5,333,266 A | 7/1994 | Boaz et al. | |
| 5,390,236 A | 2/1995 | Klausner et al. | |
| 5,524,140 A | 6/1996 | Klausner et al. | |
| 5,559,301 A | 9/1996 | Bryan, Jr. et al. | |
| 5,572,576 A | 11/1996 | Klausner et al. | |
| 5,943,052 A | 8/1999 | Allen et al. | |
| 5,973,676 A | 10/1999 | Kawakura | |
| 6,335,722 B1 | 1/2002 | Tani et al. | |
| 6,353,442 B1 | 3/2002 | Masui | |
| 6,542,171 B1 | 4/2003 | Satou et al. | |
| 6,690,387 B2 | 2/2004 | Zimmerman et al. | |
| 6,954,899 B1 | 10/2005 | Anderson | |
| 7,007,239 B1 | 2/2006 | Hawkins et al. | |
| 7,757,182 B2* | 7/2010 | Elliott et al. ................... | 715/779 |
| 2002/0077082 A1* | 6/2002 | Cruickshank ................ | 455/413 |
| 2002/0191029 A1* | 12/2002 | Gillespie et al. ............. | 345/810 |
| 2003/0026402 A1* | 2/2003 | Clapper .................... | 379/142.01 |
| 2003/0080991 A1* | 5/2003 | Crow et al. .................... | 345/716 |
| 2003/0228863 A1* | 12/2003 | Vander Veen et al. .... | 455/412.1 |
| 2004/0023643 A1* | 2/2004 | Vander Veen et al. ....... | 455/413 |
| 2004/0268262 A1* | 12/2004 | Gupta et al. .................. | 715/718 |
| 2005/0024345 A1 | 2/2005 | Eastty et al. | |
| 2005/0071437 A1* | 3/2005 | Bear et al. ..................... | 709/212 |
| 2005/0177445 A1* | 8/2005 | Church .......................... | 705/26 |
| 2006/0007174 A1* | 1/2006 | Shen ............................. | 345/173 |
| 2006/0015819 A1 | 1/2006 | Hawkins et al. | |
| 2006/0018446 A1* | 1/2006 | Schmandt et al. ......... | 379/88.17 |
| 2006/0026521 A1 | 2/2006 | Hotelling et al. | |
| 2006/0234680 A1* | 10/2006 | Doulton ..................... | 455/412.1 |
| 2006/0236262 A1 | 10/2006 | Bathiche et al. | |
| 2006/0239419 A1* | 10/2006 | Joseph et al. ................. | 379/67.1 |
| 2006/0253210 A1* | 11/2006 | Rosenberg ..................... | 700/94 |
| 2007/0124676 A1* | 5/2007 | Amundsen et al. .......... | 715/704 |
| 2007/0129059 A1* | 6/2007 | Nadarajah et al. ........... | 455/413 |
| 2007/0192744 A1* | 8/2007 | Reponen ....................... | 715/833 |
| 2008/0056459 A1* | 3/2008 | Vallier et al. .............. | 379/88.12 |
| 2008/0163131 A1 | 7/2008 | Hirai et al. | |
| 2008/0167013 A1* | 7/2008 | Novick et al. ................ | 455/413 |
| 2008/0201375 A1* | 8/2008 | Khedouri et al. ......... | 707/104.1 |
| 2008/0207176 A1* | 8/2008 | Brackbill et al. ............. | 455/413 |

FOREIGN PATENT DOCUMENTS

| | | |
|---|---|---|
| EP | 0 679 005 A1 | 10/1995 |
| EP | 0 795 811 A1 | 9/1997 |
| JP | 04 236624 | 8/1992 |
| JP | 2003 084877 | 3/2003 |
| KR | 2002-0069952 A | 9/2002 |
| WO | WO 93/20640 | 10/1993 |
| WO | WO 99/16181 | 4/1999 |
| WO | WO 00/63766 A1 | 10/2000 |
| WO | WO 2005/010725 A2 | 2/2005 |

OTHER PUBLICATIONS

Coleman, D., "Meridian Mail Voice Mail System Integrates Voice Processing and Personal Computing," Speech Technology, vol. 4, No. 2, Mar./Apr. 1988, 7 pages.

Meyers, B., "Shortcutter for Palm," http://www.cs.cmu.edu/~pebbles/v5/shortcutter/palm/index.html, The Pittsburgh Pebbles PDA Project, printed Dec. 19, 2006, 11 pages.

Microsoft Corporation, Microsoft Office Word 2003 (SP2), 1983-2003, Microsoft Corporation, SP3 as of 2005, pages MSWord2003 Figures 1-5.

Microsoft Word 2000 (9.0.2720), 1999, Microsoft Corporation, Pages MSWord figures 1-5.

Northern Telecom, "Meridian Mail PC User Guide," 17 pages.

Schmandt, C. et al., "A Conversational Telephone Messaging System," IEEE Transactions on Consumer Electronics, Aug. 1984, vol. CE-30, 4 pages.

Schmandt, C. et al., "Phone Slave: A Graphical Telecommunications Interface," Proceeding of the SID, vol. 26/1, 1985, 4 pages.

Schmandt, C. et al., "Phone Slave: A Graphical Telecommunications Interface," Society for Information Display, 1984 International Symposium Digest of Technical Papers, Jun. 1984, San Francisco, CA, 4 pages.

International Search Report and Written Opinion dated Feb. 21, 2008, received in International Application No. PCT/US2007/077443, which corresponds to U.S. Appl. No. 11/770,720, 11 pages (Anzures).

International Search Report and Written Opinion dated Jul. 4, 2008, received in International Application No. PCT/US2008/050083, which corresponds to U.S. Appl. No. 11/968,064, 14 pages (Ording).

Office Action dated Feb. 17, 2010, received in Australian Patent Application No. 2007292473, which corresponds to U.S. Appl. No. 11/770,720, 1 page (Anzures).

Office Action dated Oct. 25, 2010, received in Chinese Patent Application No. 200780040362.1, which corresponds to U.S. Appl. No. 11/770,720, 18 pages (Anzures).

Office Action dated Jun. 7, 2010, received in German Patent Application No. 11 2007 002 090.3-53, which corresponds to U.S. Appl. No. 11/770,720, 8 pages (Anzures).

Office Action dated Feb. 24, 2010, received in European Patent Application No. 07 814 635.4-2212, which corresponds to U.S. Appl. No. 11/770,720, 4 pages (Anzures).

Summons to attend oral proceedings dated Nov. 24, 2010 received in European Patent Application No. 07 814 635.4, which corresponds to U.S. Appl. No. 11/770,720, 5 pages (Anzures).

Office Action dated Feb. 15, 2011, received in Korean Patent Application No. 10-2009-7007062, which corresponds to U.S. Appl. No. 11/770,720, 3 pages (Anzures).

(56) References Cited

OTHER PUBLICATIONS

Office Action dated May 15, 2009, received in U.S. Appl. No. 11/968,064, 20 pages (Ording).
Final Office dated Jan. 5, 2010, received in U.S. Appl. No. 11/968,064, 20 pages (Ording).
Office Action dated Jan. 4, 2011, received in U.S. Appl. No. 11/770,720, 18 pages (Anzures).
Notice of Allowance dated May 20, 2011 received in U.S. Appl. No. 11/770,720, 8 pages (Anzures).
Office Action dated Feb. 6, 2013, received in Canadian Patent Application No. 2,661,856, which corresponds to U.S. Appl. No. 11/770,720, 2 pages (Anzures).
Office Action dated Jul. 21, 2011, received in Chinese Patent Application No. 200780040362.1, which corresponds to U.S. Appl. No. 11/770,720, 19 pages (Anzures).
Decision to Grant dated Nov. 4, 2011, received in European Patent Application No. 2 069 895, which corresponds to U.S. Appl. No. 11/770,720, 1 page (Anzures).
Office Action dated Jun. 6, 2011, received in Japanese Patent Application No. 2009 527504, which corresponds to U.S. Appl. No. 11/770,720, 4 pages (Anzures).
Notice of Allowance dated Dec. 24, 2012, received in Korean Patent Application No. 10 2009 7007062, which corresponds to U.S. Appl. No. 11/770,720, 4 pages (Anzures).

\* cited by examiner

VOICEMAIL MANAGER FOR PORTABLE MULTIFUNCTION DEVICE

RELATED APPLICATIONS

This application is a continuation of U.S. application Ser. No. 11/770,720, filed Jun. 28, 2007 now U.S. Pat. No. 7,996,792, entitled "Voicemail Manager for Portable Multifunction Device," which claims priority to: (A) U.S. Provisional Patent Application No. 60/879,469, filed Jan. 8, 2007, entitled "Portable Multifunction Device"; (B) U.S. Provisional Patent Application No. 60/879,253, filed Jan. 7, 2007, entitled "Portable Multifunction Device"; (C) U.S. Provisional Patent Application No. 60/883,799, filed Jan. 7, 2007, entitled "Voicemail Manager for Portable Multifunction Device"; and (D) U.S. Provisional Patent Application No. 60/824,769, filed Sep. 6, 2006, entitled "Portable Multifunction Device." All of these applications are incorporated by referenced herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; and (10) U.S. patent application Ser. No. 11/367,749, "Multi-Functional Hand-Held Device," filed Mar. 3, 2006. All of these applications are incorporated by reference herein.

TECHNICAL FIELD

The disclosed embodiments relate generally to portable electronic devices, and more particularly, to portable devices that access voicemail.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Many portable electronic devices, such as cellular phones, have access to voicemail. But navigating through the user interface of the device to retrieve, listen to, delete, and otherwise manage voicemail is cumbersome and inefficient.

Accordingly, there is a need for portable multifunction devices with more transparent, intuitive, and efficient user interfaces for managing voicemail messages that are easy to use, configure, and/or adapt.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be stored in a computer readable storage medium configured for execution by one or more processors.

In one aspect of the invention, a computer-implemented method, performed at a portable electronic device with a touch screen display, includes: displaying a list of voicemail messages, detecting selection by a user of a respective voicemail message in the list, and responding to the user selection of the respective voicemail message by initiating playback of the user-selected voicemail message. The method also includes: displaying a progress bar for the user-selected voicemail message, wherein the progress bar indicates the portion of the user-selected voicemail message that has been played; detecting movement of a finger of the user from a first position on the progress bar to a second position on the progress bar; and responding to the detection of the finger movement by restarting playback of the user-selected voicemail message at a position within the user-selected voicemail message corresponding substantially to the second position on the progress bar, and changing the indicated portion of the user-selected voicemail message that has been played to correspond substantially to the second position on the progress bar.

In another aspect of the invention, a graphical user interface on a portable electronic device with a touch screen display includes a list of voicemail messages and a progress bar. In response to detecting selection by a user of a respective voicemail message in the list, playback of the user-selected voicemail message is initiated. The progress bar indicates the portion of the user-selected voicemail message that has been played. In response to detecting movement of a finger of the user from a first position on the progress bar to a second position on the progress bar, playback of the user-selected voicemail message is restarted at a position within the user-selected voicemail message corresponding substantially to the second position on the progress bar, and the indicated portion of the user-selected voicemail message that has been played is changed to correspond substantially to the second position on the progress bar.

In another aspect of the invention, a portable electronic device includes a touch screen display, one or more processors, memory, and one or more programs. The one or more programs are stored in the memory and configured to be executed by the one or more processors. The one or more programs include: instructions for displaying a list of voicemail messages; instructions for detecting selection by a user of a respective voicemail message in the list; instructions for responding to the user selection of the respective voicemail message by initiating playback of the user-selected voicemail message; instructions for displaying a progress bar for the user-selected voicemail message, wherein the progress bar indicates the portion of the user-selected voicemail message that has been played; instructions for detecting movement of a finger of the user from a first position on the progress bar to a second position on the progress bar; and instructions for responding to the detection of the finger movement by restarting playback of the user-selected voicemail message at a position within the user-selected voicemail message corresponding substantially to the second position on the progress bar, and changing the indicated portion of the user-selected voicemail message that has been played to correspond substantially to the second position on the progress bar.

In another aspect of the invention, a computer readable storage medium stores one or more programs, including instructions which when executed by a portable electronic device with a touch screen display, cause the device to: display a list of voicemail messages; detect selection by a user of a respective voicemail message in the list; respond to the user selection of the respective voicemail message by initiating playback of the user-selected voicemail message; display a progress bar for the user-selected voicemail message, wherein the progress bar indicates the portion of the user-selected voicemail message that has been played; detect movement of a finger of the user from a first position on the progress bar to a second position on the progress bar; and respond to the detection of the finger movement by restarting playback of the user-selected voicemail message at a position within the user-selected voicemail message corresponding substantially to the second position on the progress bar, and changing the indicated portion of the user-selected voicemail message that has been played to correspond substantially to the second position on the progress bar.

In another aspect of the invention, a portable electronic device with a touch screen display includes: means for displaying a list of voicemail messages; means for detecting selection by a user of a respective voicemail message in the list; means for responding to the user selection of the respective voicemail message by initiating playback of the user-selected voicemail message; means for displaying a progress bar for the user-selected voicemail message, wherein the progress bar indicates the portion of the user-selected voicemail message that has been played; means for detecting movement of a finger of the user from a first position on the progress bar to a second position on the progress bar; and means for responding to the detection of the finger movement by restarting playback of the user-selected voicemail message at a position within the user-selected voicemail message corresponding substantially to the second position on the progress bar, and changing the indicated portion of the user-selected voicemail message that has been played to correspond substantially to the second position on the progress bar.

In another aspect of the invention, a computer-implemented method, performed at a portable electronic device with a touch screen display, includes: displaying a list of voicemail messages; detecting selection by a user of a respective voicemail message in the list; responding to the user selection of the respective voicemail message by initiating playback of the user-selected voicemail message; displaying a progress bar for the user-selected voicemail message, wherein the progress bar indicates the portion of the user-selected voicemail message that has been played; detecting a finger of the user at a position on the progress bar; and responding to the detection of the finger by restarting playback of the user-selected voicemail message at a position within the user-selected voicemail message corresponding substantially to the position of the finger on the progress bar, and changing the indicated portion of the user-selected voicemail message that has been played to correspond substantially to the position of the finger on the progress bar.

In another aspect of the invention, a graphical user interface on a portable electronic device with a touch screen display includes a list of voicemail messages and a progress bar. In response to detecting selection by a user of a respective voicemail message in the list, playback of the user-selected voicemail message is initiated. The progress bar indicates the portion of the user-selected voicemail message that has been played. In response to detecting a finger of the user at a position on the progress bar, playback of the user-selected voicemail message is restarted at a position within the user-selected voicemail message corresponding substantially to the position of the finger on the progress bar, and the indicated portion of the user-selected voicemail message that has been played is changed to correspond substantially to the position of the finger on the progress bar.

In another aspect of the invention, a portable electronic device includes: a touch screen display; one or more processors; memory; and one or more programs. The one or more programs are stored in the memory and configured to be executed by the one or more processors. The one or more programs include: instructions for displaying a list of voicemail messages; instructions for detecting selection by a user of a respective voicemail message in the list; instructions for responding to the user selection of the respective voicemail message by initiating playback of the user-selected voicemail message; instructions for displaying a progress bar for the user-selected voicemail message, wherein the progress bar indicates the portion of the user-selected voicemail message that has been played; instructions for detecting a finger of the user at a position on the progress bar; and instructions for responding to the detection of the finger by restarting playback of the user-selected voicemail message at a position within the user-selected voicemail message corresponding substantially to the position of the finger on the progress bar, and changing the indicated portion of the user-selected voicemail message that has been played to correspond substantially to the position of the finger on the progress bar.

In another aspect of the invention, a computer readable storage medium stores one or more programs, including instructions, which when executed by a portable electronic device with a touch screen display, cause the device to: display a list of voicemail messages; detect selection by a user of a respective voicemail message in the list; respond to the user selection of the respective voicemail message by initiating playback of the user-selected voicemail message; display a progress bar for the user-selected voicemail message, wherein the progress bar indicates the portion of the user-selected voicemail message that has been played; detect a finger of the user at a position on the progress bar; and respond to the detection of the finger by restarting playback of the user-selected voicemail message at a position within the user-selected voicemail message corresponding substantially to the position of the finger on the progress bar, and changing the indicated portion of the user-selected voicemail message that has been played to correspond substantially to the position of the finger on the progress bar.

In another aspect of the invention, a portable electronic device with a touch screen display includes: means for displaying a list of voicemail messages; means for detecting selection by a user of a respective voicemail message in the list; means for responding to the user selection of the respective voicemail message by initiating playback of the user-selected voicemail message; means for displaying a progress bar for the user-selected voicemail message, wherein the progress bar indicates the portion of the user-selected voicemail message that has been played; means for detecting a finger of the user at a position on the progress bar; and means for responding to the detection of the finger by restarting playback of the user-selected voicemail message at a position within the user-selected voicemail message corresponding substantially to the position of the finger on the progress bar, and changing the indicated portion of the user-selected voicemail message that has been played to correspond substantially to the position of the finger on the progress bar.

In another aspect of the invention, a computer-implemented method at a portable electronic device with a touch screen display includes: displaying a list of voicemail messages; detecting selection by a user of a respective voicemail message in the list; responding to the user selection of the respective voicemail message by initiating playback of the user-selected voicemail message; detecting a finger contact with a predefined area on the touch screen display, wherein the predefined area includes a progress bar that is configured to slide in a first direction in the predefined area on the touch screen display; detecting movement of the finger contact on the touch screen display from the predefined area to a location outside the predefined area, wherein the movement of the finger contact on the touch screen display has a component parallel to the first direction and a component perpendicular to the first direction; sliding the progress bar in the predefined area in accordance with the component of the movement of the finger contact that is parallel to the first direction; and restarting playback of the user-selected voicemail message at a position within the user-selected voicemail message corresponding substantially to the position of the slid progress bar.

In another aspect of the invention, a graphical user interface on a portable electronic device with a touch screen display includes a list of voicemail messages and a progress bar. In response to detecting selection by a user of a respective voicemail message in the list, playback of the user-selected voicemail message is initiated. In response to: detecting a finger contact with a predefined area on the touch screen display, wherein the predefined area includes a progress bar that is configured to slide in a first direction in the predefined area on the touch screen display, and detecting movement of the finger contact on the touch screen display from the predefined area to a location outside the predefined area, wherein the movement of the finger contact on the touch screen display has a component parallel to the first direction and a component perpendicular to the first direction, the progress bar is slid in the predefined area in accordance with the component of the movement of the finger contact that is parallel to the first direction, and playback of the user-selected voicemail message is restarted at a position within the user-selected voicemail message corresponding substantially to the position of the slid progress bar.

In another aspect of the invention, a portable electronic device includes: a touch screen display; one or more processors; memory; and one or more programs. The one or more programs are stored in the memory and configured to be executed by the one or more processors. The one or more programs include: instructions for displaying a list of voicemail messages; instructions for detecting selection by a user of a respective voicemail message in the list; instructions for responding to the user selection of the respective voicemail message by initiating playback of the user-selected voicemail message; instructions for detecting a finger contact with a predefined area on the touch screen display, wherein the predefined area includes a progress bar that is configured to slide in a first direction in the predefined area on the touch screen display; instructions for detecting movement of the finger contact on the touch screen display from the predefined area to a location outside the predefined area, wherein the movement of the finger contact on the touch screen display has a component parallel to the first direction and a component perpendicular to the first direction; instructions for sliding the progress bar in the predefined area in accordance with the component of the movement of the finger contact that is parallel to the first direction; and instructions for restarting playback of the user-selected voicemail message at a position within the user-selected voicemail message corresponding substantially to the position of the slid progress bar.

In another aspect of the invention, a computer readable storage medium stores one or more programs, including instructions, which when executed by a portable electronic device with a touch screen display, cause the device to: display a list of voicemail messages; detect selection by a user of a respective voicemail message in the list; respond to the user selection of the respective voicemail message by initiating playback of the user-selected voicemail message; detect a finger contact with a predefined area on the touch screen display, wherein the predefined area includes a progress bar that is configured to slide in a first direction in the predefined area on the touch screen display; detect movement of the finger contact on the touch screen display from the predefined area to a location outside the predefined area, wherein the movement of the finger contact on the touch screen display has a component parallel to the first direction and a component perpendicular to the first direction; slide the progress bar in the predefined area in accordance with the component of the movement of the finger contact that is parallel to the first direction; and restart playback of the user-selected voicemail message at a position within the user-selected voicemail message corresponding substantially to the position of the slid progress bar.

In another aspect of the invention, a portable electronic device with a touch screen display includes: means for displaying a list of voicemail messages; means for detecting selection by a user of a respective voicemail message in the list; means for responding to the user selection of the respective voicemail message by initiating playback of the user-selected voicemail message; means for detecting a finger contact with a predefined area on the touch screen display, wherein the predefined area includes a progress bar that is configured to slide in a first direction in the predefined area on the touch screen display; means for detecting movement of the finger contact on the touch screen display from the predefined area to a location outside the predefined area, wherein the movement of the finger contact on the touch screen display has a component parallel to the first direction and a component perpendicular to the first direction; means for sliding the progress bar in the predefined area in accordance with the component of the movement of the finger contact that is parallel to the first direction; and means for restarting playback of the user-selected voicemail message at a position within the user-selected voicemail message corresponding substantially to the position of the slid progress bar.

Thus, the invention provides an intuitive, easy-to-use interface to retrieve, listen to, and otherwise manage voicemail messages on a portable electronic device with a touch screen display.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
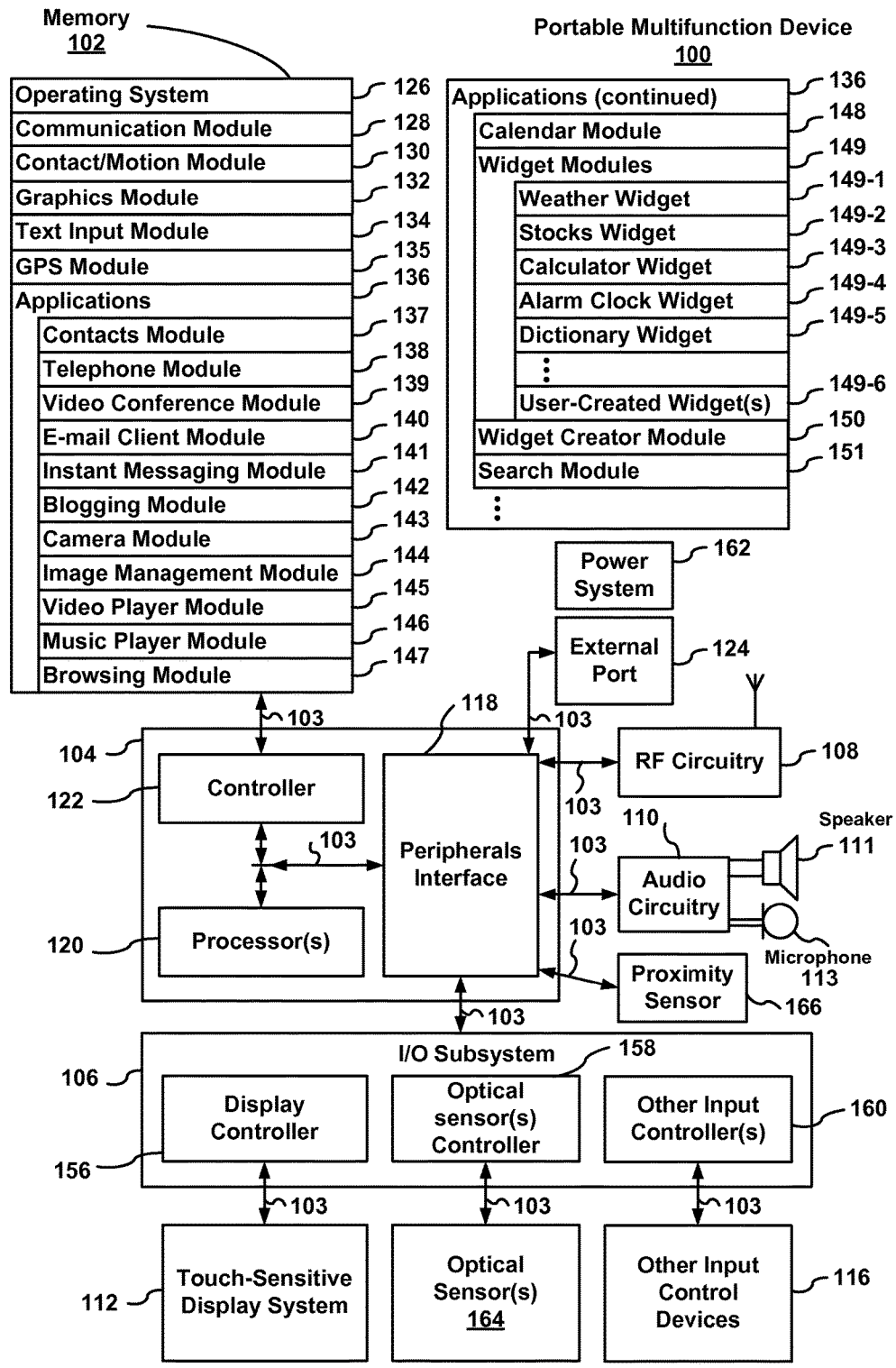
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen 112 displays visual output from the portable device 100, whereas touch sensitive tablets do not provide visual output. The touch screen 112 may have a resolution in excess of 100 dpi. In an exemplary embodiment, the touch screen has a resolution of approximately 168 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143, the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005, and Ser. No. 11/240,788, "Proximity Detector In Handheld Device," filed Sep. 30, 2005, which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6; and/or
- search module 151.

Examples of other applications 136 that may be stored in memory 102 include memo pad and other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol), to receive instant messages and to view received instant messages. In some embodiments, transmitted and/or received instant messages may include graphics, photos, audio files, video files and/or other attachments as are supported in a MMS and/or an Enhanced Messaging Service (EMS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
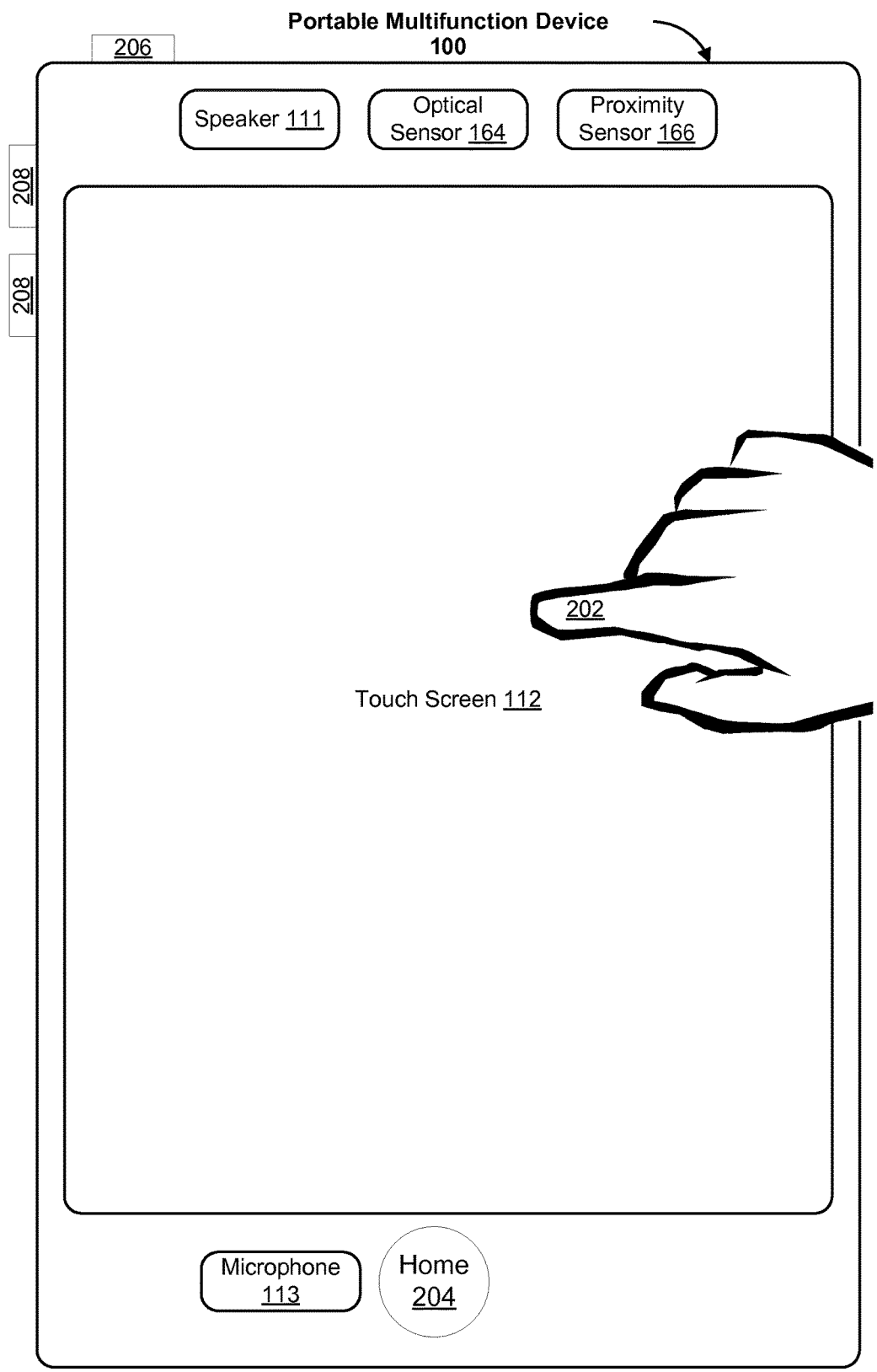
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
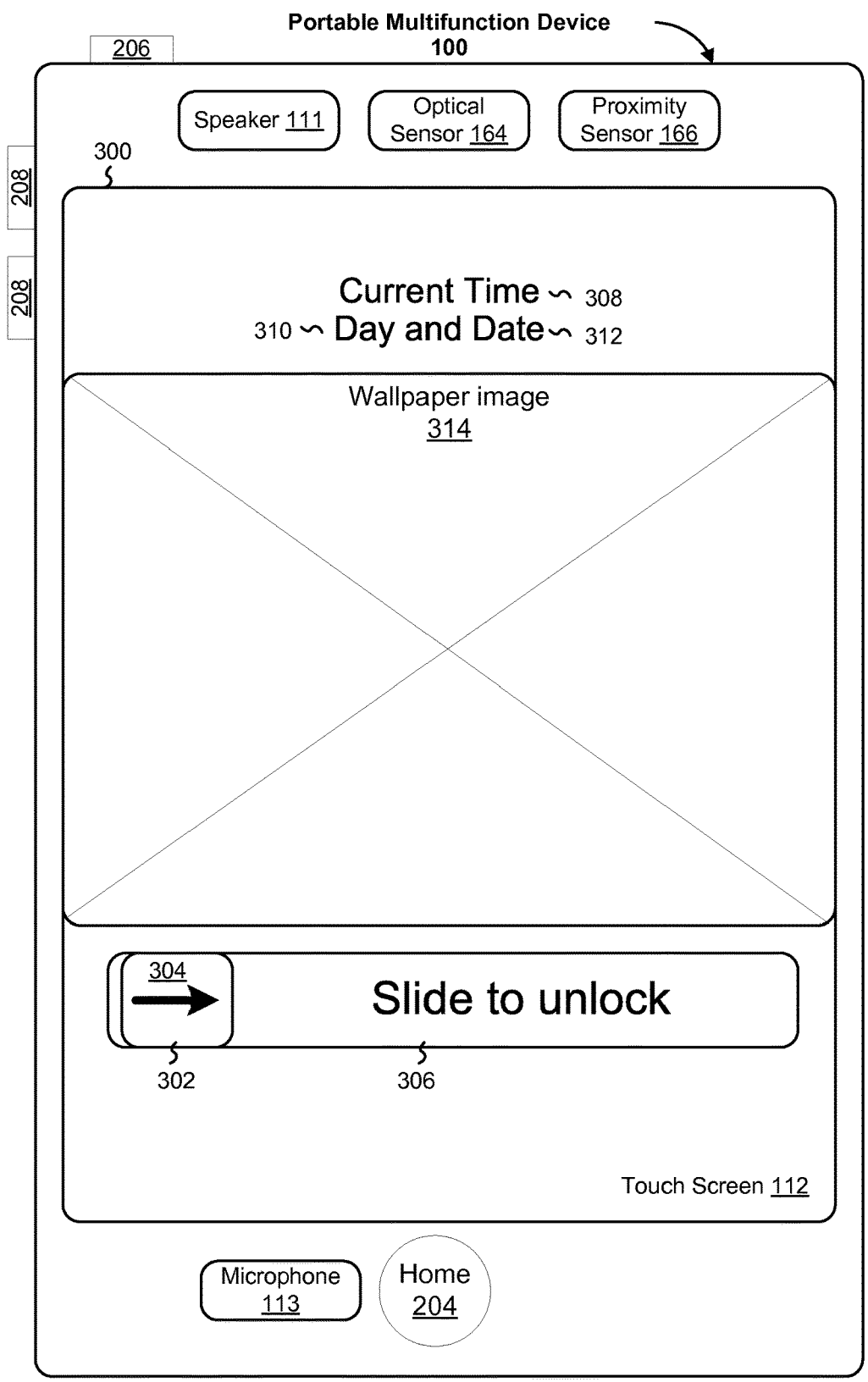
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking a Device by Performing Gestures on an Unlock Image," filed Dec. 23, 2005, which is hereby incorporated by reference.

Figure 4:
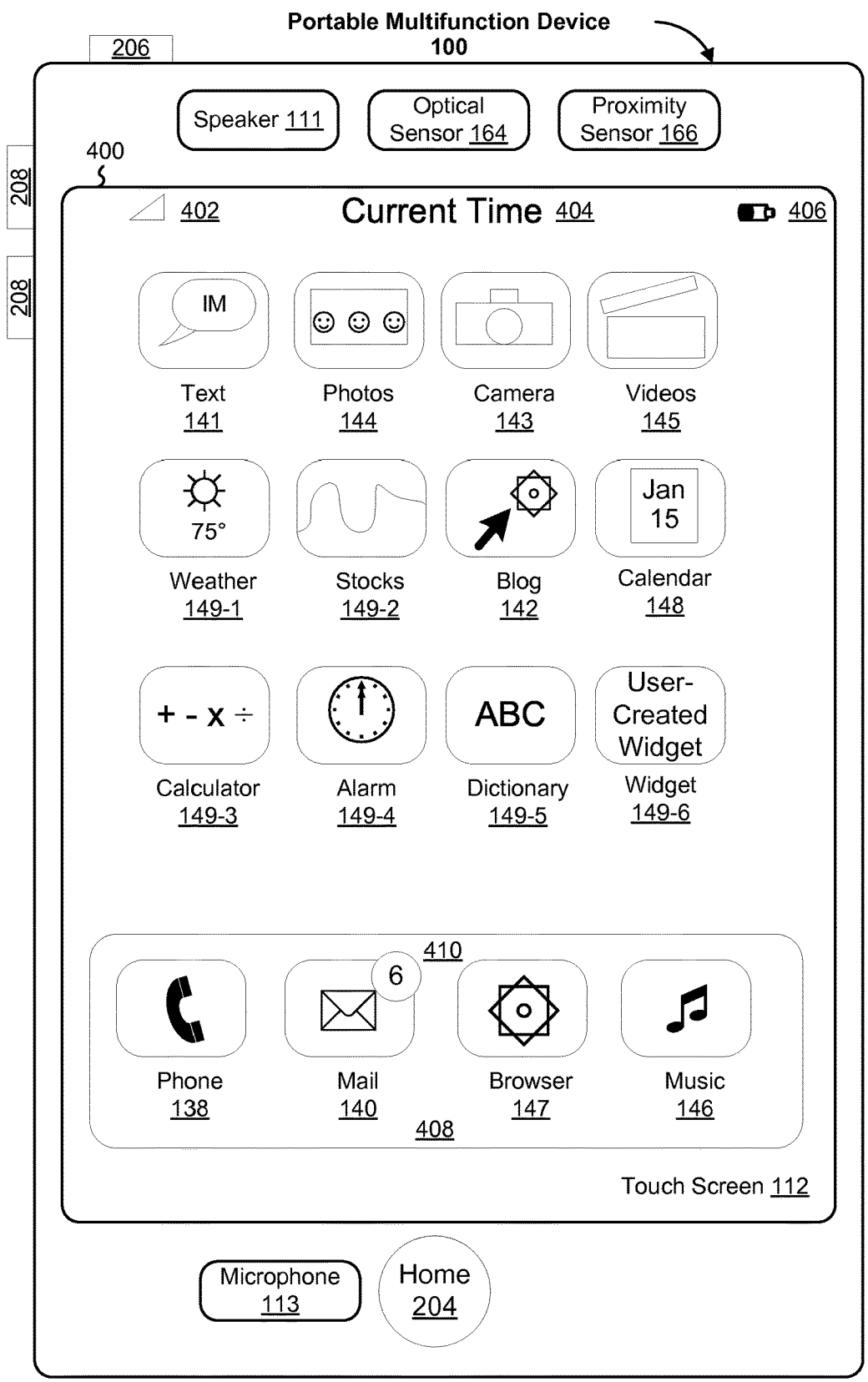
FIG. 4 illustrates an exemplary user interface for a menu of applications on a portable multifunction device in accordance with some embodiments.

FIG. 4 illustrates an exemplary user interface for a menu of applications on a portable multifunction device in accordance with some embodiments. In some embodiments, user interface 400 includes the following elements, or a subset or superset thereof:

Signal strength indicator 402 for wireless communication;
Time 404;
Battery status indicator 406;
Tray 408 with icons for frequently used applications, such as:
Phone 138;
E-mail client 140, which may include an indicator 410 of the number of unread e-mails;
Browser 147; and
Music player 146; and
Icons for other applications, such as:
IM 141;
Image management 144;
Camera 143;
Video player 145;
Weather 149-1;
Stocks 149-2;
Blog 142;
Calendar 148;
Calculator 149-3;
Alarm clock 149-4;
Dictionary 149-5; and
User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference.

Figure 5A:
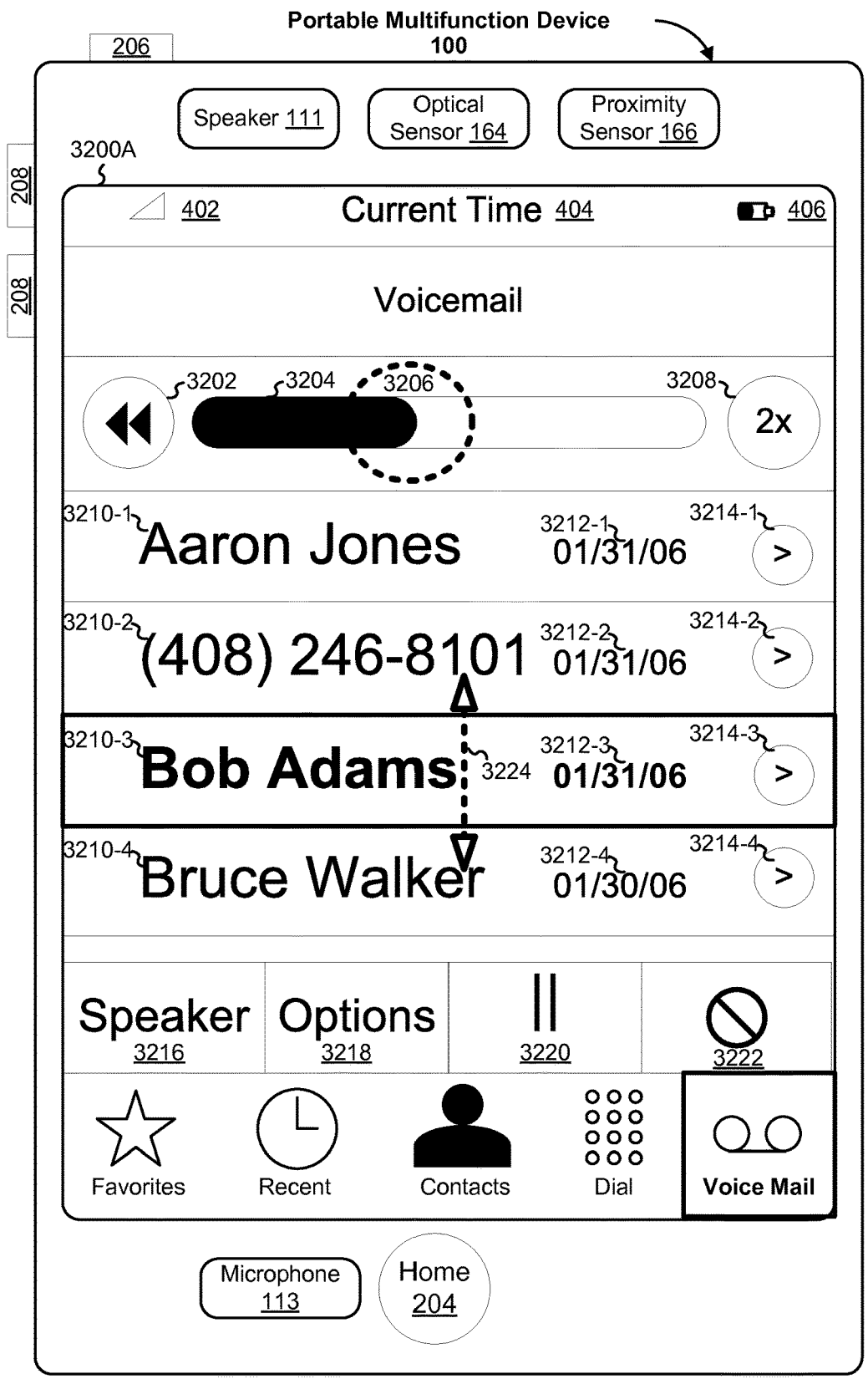
FIGS. 5A and 5B illustrate an exemplary user interface for voicemail in accordance with some embodiments.
Figure 5B:
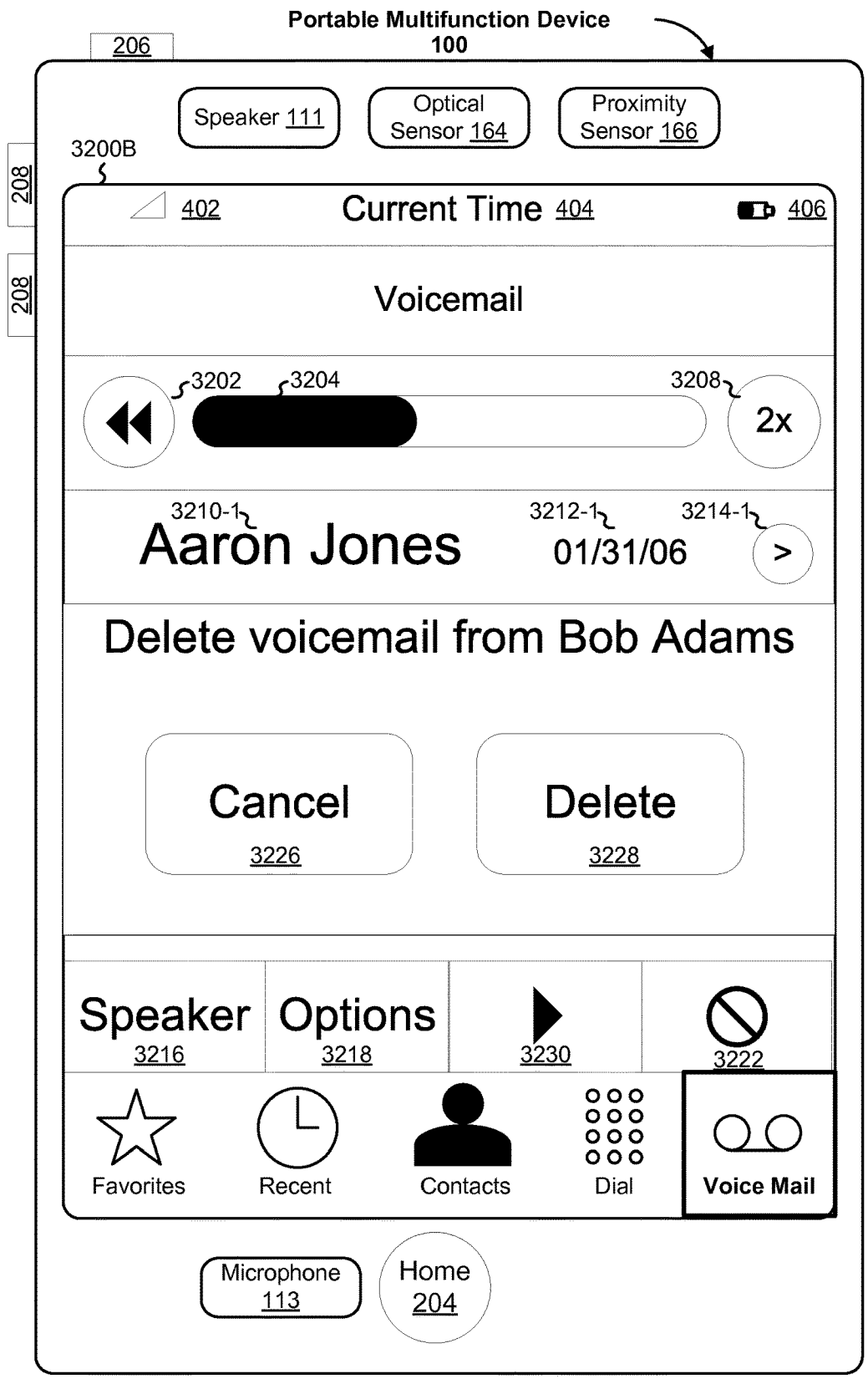

FIGS. 5A and 5B illustrate an exemplary user interface for voicemail in accordance with some embodiments. In some embodiments, user interfaces 3200A and 3200B include the following elements, or a subset or superset thereof:
402, 404, and 406, as described above;

backup icon 3202 that when activated (e.g., by a finger tap on the icon) initiates a process that backs up and replays the preceding few seconds (e.g., 1 to 5 seconds) of the voicemail message;

Progress bar 3204 that indicates what fraction of a voicemail message has been played and that may be used to help scroll through the message in response to detection of a user gesture 3206;

Speed up icon 3208 that when activated (e.g., by a finger tap on the icon) initiates a process that speeds up playback of the voicemail message, which may also adjust the sound frequency or pitch of the fast playback so that the words, although played back quickly, are still easy to understand:

Names 3210 of the people (associated with incoming phone numbers via the user's contact list) who have left voicemail messages (e.g., Aaron Jones 3210-1) or the phone number if the person's name is not available (e.g., 408-246-8101 3210-2);

Date 3212 and/or time of the voicemail;

Additional information icon 3214 that when activated (e.g., by a finger tap on the icon) initiates transition to the corresponding contact list entry (not shown) or to a UI for unknown phone numbers (not shown);

Speaker icon 3216 that when activated (e.g., by a finger tap on the icon) initiates playback of the voicemail through a speaker;

Options icon 3218 that when activated (e.g., by a finger tap on the icon) initiates display of a menu of additional voicemail options;

Pause icon 3220 that when activated (e.g., by a finger tap on the icon) initiates pausing of the voicemail;

Delete symbol icon 3222 that when activated (e.g., by a finger tap on the icon) initiates display of a UI to confirm that the user wants to delete the corresponding voicemail (e.g. UI 3200B, FIG. 32B).

Cancel icon 3226 that when activated (e.g., by a finger tap on the icon) changes the display from UI 3200B to UI 3200A without deleting the corresponding voicemail;

Delete icon 3228 that when activated (e.g., by a finger tap on the icon) deletes the corresponding voicemail and changes the display from UI 3200B to UI 3200A; and Play icon 3230 that when activated (e.g., by a finger tap on the icon) initiates or continues playback of the voicemail.

If the list of voicemail messages fills more than the screen area, the user may scroll through the list using substantially vertical upward and/or downward gestures 3224 on the touch screen.

In some embodiments, in response to detection of a user tap or other predefined gesture in the row corresponding to a particular voicemail (but other than a tap or gesture on icon 3214), the phone module initiates playback of the corresponding voicemail. Thus, there is random access to the voicemails and the voicemails may be heard in any order.

In some embodiments, in response to detection of a user gesture, the playback position in the voicemail can be modified. For example, in response to detection of the user's finger touching 3206 the progress bar and then sliding along the progress bar, the playback position may be altered to correspond to the position of the user's finger along the progress bar. This user gesture on the progress bar makes it easy for a user to skip to and/or replay portions of interest in the voicemail message.

Figure 6A:
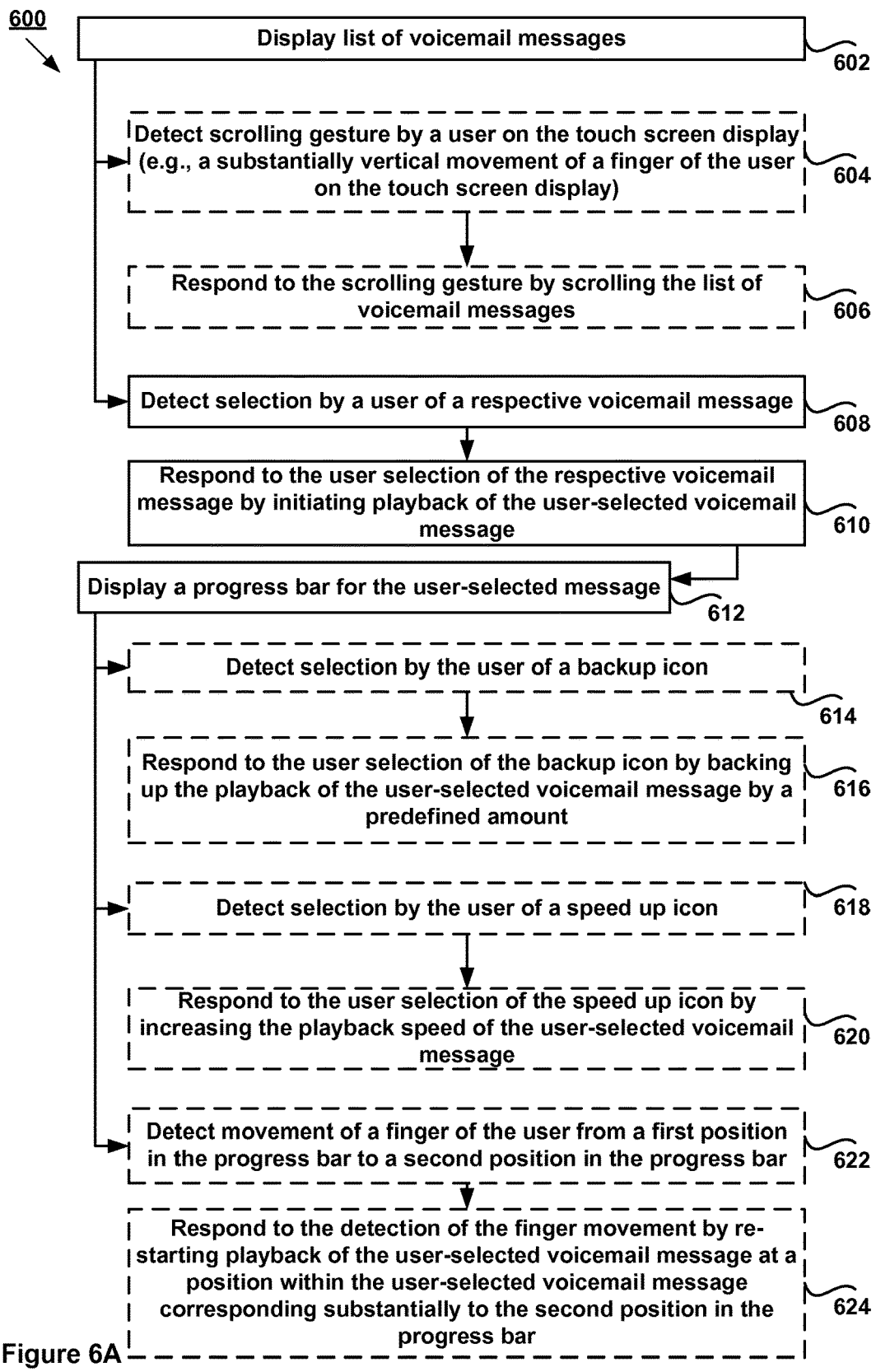
FIGS. 6A-6C are flow diagrams of processes for accessing voicemail messages in accordance with some embodiments.
Figure 6B:
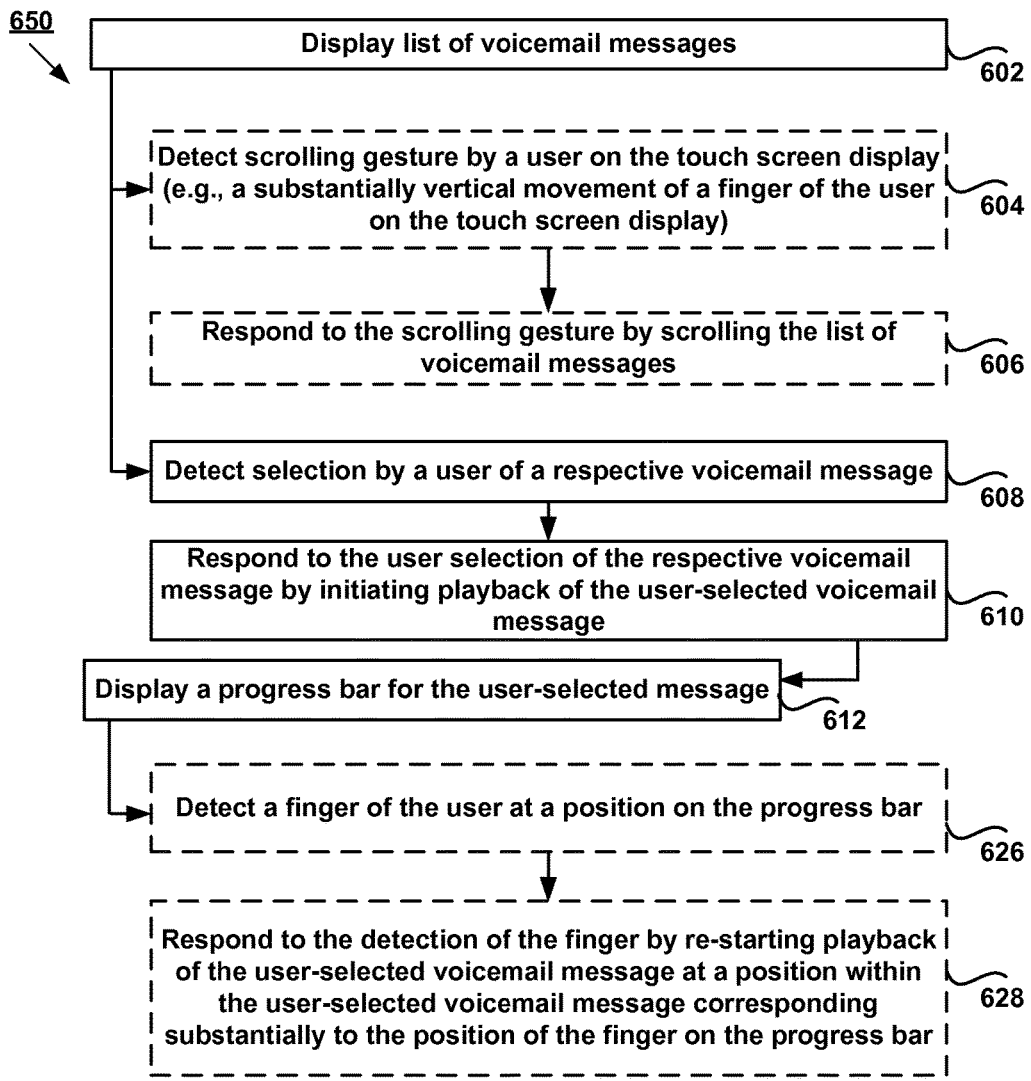
Figure 6C:
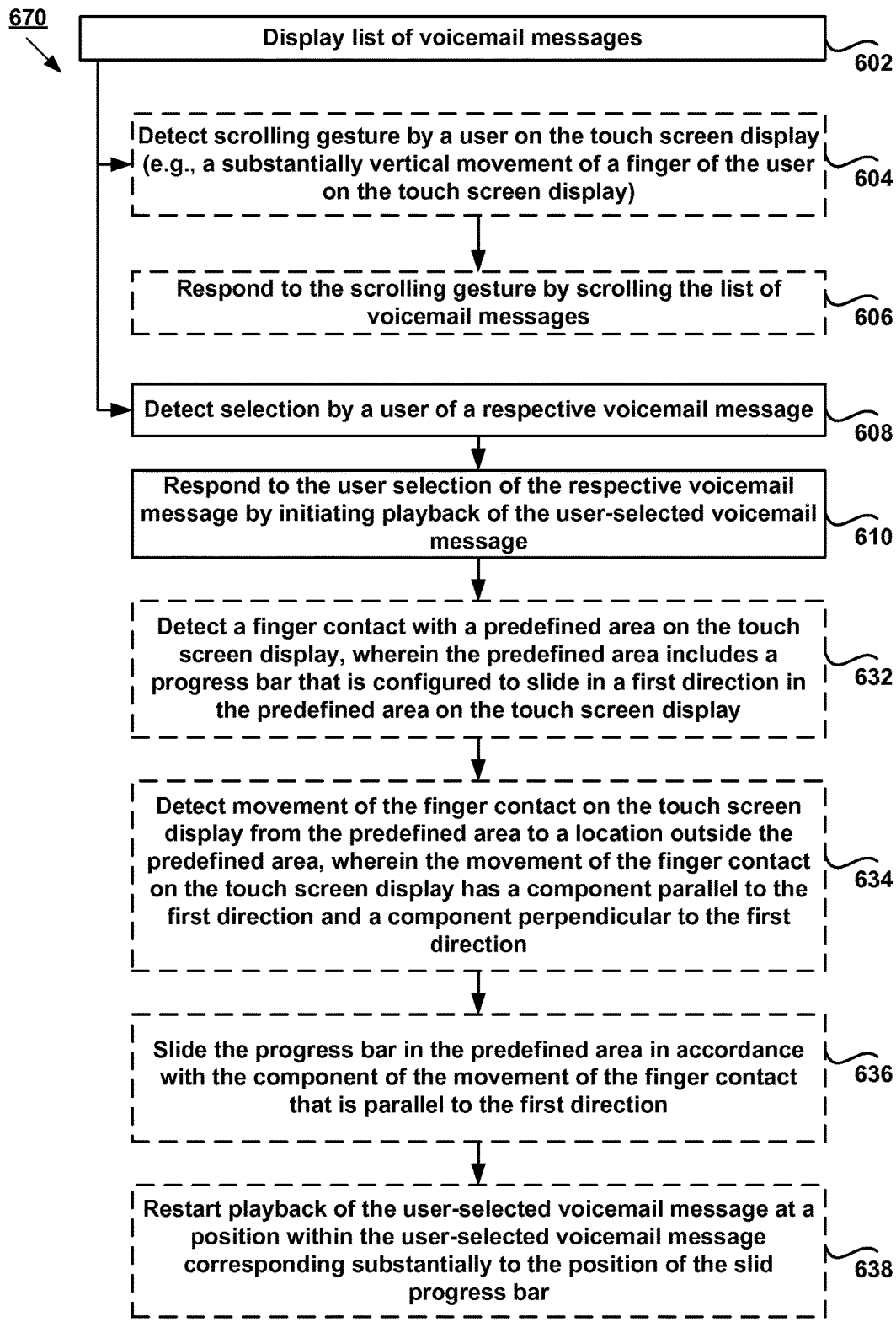

FIGS. 6A-6C are flow diagrams of processes 600, 650, and 670 for accessing voicemail messages in accordance with some embodiments. In some embodiments, the processes are performed by a portable electronic device (e.g., device 100) with a touch screen display (e.g., touch-sensitive display 112). The device displays a list of voicemail messages (602) (e.g., UI 3200A, FIG. 5A). In some embodiments, the device may detect a scrolling gesture (e.g., gesture 3224) by a user on the touch screen display (604). In some embodiments, the scrolling gesture comprises a substantially vertical movement of the user's finger on the touch screen display. In some embodiments, the scrolling gesture has a horizontal position on the touch screen and detecting the scrolling gesture is independent of the horizontal position of the gesture on the touch screen. The device responds to the scrolling gesture by scrolling the list of voicemail messages (606).

The device detects selection by a user of a respective voicemail message (608). In some embodiments, detecting selection by the user of a respective voicemail message comprises detecting a tap gesture by the finger of the user on the respective voicemail message. For example, user selection may be accomplished by a user tap or other predefined gesture in the row in UI 3200A (FIG. 5A) corresponding to a particular voicemail (but other than a tap or gesture on icon 3214). The device responds to the user selection of the respective voicemail message by initiating playback of the user-selected voicemail message (610). In some embodiments, the respective voicemail message in the list is highlighted (e.g., Bob Adams 3210-3, FIG. 5A).

In some embodiments, the device responds to the user selection of the respective voicemail message by also displaying a progress bar (e.g., progress bar 3204) for the user-selected message (612). As shown in FIGS. 5A and 5B and explained above, the progress bar indicates the portion of the user-selected voicemail message that has been played. The progress bar may be used to help scroll through the message in response to a user gesture (e.g., gesture 3206).

If a user selects a backup icon (e.g., backup icon 3202), for example, by a finger tap on the backup icon, the device detects such selection (614) and responds to the user selection of the backup icon by backing up the playback of the user-selected voicemail message by a predefined amount (616). In some embodiments, the predefined amount is between one and five seconds.

Similarly, if a user selects a speed up icon (e.g., speed up icon 3208), for example, by a finger tap on the icon, the device detects such selection (618) and responds to the user selection of the speed up icon by increasing the playback speed of the user-selected voicemail message (620). In some embodiments, the playback speed is increased by at least fifty percent (50%). In some embodiments, the playback speed is increased by a factor between 1.5 and 2.2 in response to detecting user selection of the speed up icon 3208. In some embodiments, the sound frequency or pitch of the playback is adjusted. Adjusting the sound frequency or pitch helps the playback to be easily understood despite the increased playback speed.

In some embodiments, a user may modify the playback position of the selected voicemail by gesturing on the displayed progress bar 3204. In some embodiments, the device detects movement of a finger of the user from a first position on the progress bar to a second position on the progress bar (622). In some embodiments, the first position in the progress bar corresponds to a current playback position. The device responds to the detection of the finger movement by restarting playback of the user-selected voicemail message at a position within the user-selected voicemail message corresponding substantially to the second position on the progress bar (624). In some embodiments, the indicated portion of the user-selected voicemail message that has been played is changed to correspond substantially to the second position on the progress bar.

In some embodiments, the device detects a finger of the user at a position on the progress bar (626). In some embodiments, the device responds to the detection of the finger movement by restarting (628) playback of the user-selected voicemail message at a position within the user-selected voicemail message corresponding substantially to the position of a finger on the progress bar, independent of whether the finger was moved on the progress bar. For example, playback of the user-selected voicemail message may be restarted at a position within the user-selected voicemail message corresponding substantially to a position of a finger on the progress bar that is maintained for greater than a predetermined amount of time (e.g., one second). As another example, playback of the user-selected voicemail message may be restarted at a position within the user-selected voicemail message corresponding substantially to a position of a finger on the progress bar just prior to lift off of the finger, independent of whether the finger was moved on the progress bar.

In some embodiments, while the device displays a progress bar (e.g., progress bar 3204) for the user-selected message, a finger contact is detected (632) with a predefined area on the touch screen display, wherein the predefined area includes a progress bar that is configured to slide in a first direction in the predefined area on the touch screen display. Movement of the finger contact is detected (634) on the touch screen display from the predefined area to a location outside the predefined area, wherein the movement of the finger contact on the touch screen display has a component parallel to the first direction and a component perpendicular to the first direction. The progress bar slides (636) in the predefined area in accordance with the component of the movement of the finger contact that is parallel to the first direction. Playback of the user-selected voicemail message is restarted (638) at a position within the user-selected voicemail message corresponding substantially to the position of the slid progress bar. In this embodiment, the user can adjust the position of the progress bar without the user's finger obscuring the progress bar.

While the processes 600, 650, and 670 for retrieving voice messages described above include a number of operations that appear to occur in a specific order, it should be apparent that the processes can include more or fewer operations. Furthermore, an order of two or more operations may be changed and/or two or more operations may be combined into a single operation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A portable electronic device, comprising:
   a touch screen display;
   one or more processors;
   memory; and
   one or more programs stored in the memory and configured to be executed by the one or more processors, the one or more programs including instructions for:
   displaying, on the touch screen display, a list of voicemail messages;
   detecting a user selection of a respective voicemail message in the list;
   in response to detecting the user selection of the respective voicemail message, displaying, on the touch screen display, a progress bar corresponding to the user-selected voicemail message;
   playing the user-selected voicemail message, wherein a playback indicator of the progress bar indicates a played portion of the user-selected voicemail message, and wherein the playback indicator is configured to slide in a first direction along the progress bar;
   detecting a finger contact on the touch screen display at a location on the progress bar;
   detecting, on the touch screen display, continuous movement of the finger contact from the location on the progress bar to a location other than the progress bar, the continuous movement of the finger contact having a component parallel to the first direction and a component perpendicular to the first direction;
   in response to detecting the continuous movement, causing the playback indicator to slide along the progress bar from a first position on the progress bar to a second position on the progress bar in accordance with the component of the movement of the finger contact that is parallel to the first direction; and
   restarting playback of a portion of the user-selected voicemail message corresponding to the second position on the progress bar.

2. The device of claim 1, wherein the one or more programs further include instructions for:
   detecting a scrolling gesture; and
   in response to detecting the scrolling gesture, scrolling the list of voicemail messages.

3. The device of claim 2, wherein the scrolling gesture comprises a vertical movement of a finger of the user on the touch screen display.

4. The device of claim 2, wherein the scrolling gesture has a horizontal position on the touch screen, and detecting the scrolling gesture is independent of the horizontal position of the gesture on the touch screen.

5. The device of claim 1, wherein detecting selection by the user of a respective voicemail message comprises detecting a tap gesture by the finger of the user on the respective voicemail message.

6. The device of claim 1, wherein responding to the user selection of the respective voicemail message includes highlighting the respective voicemail message in the list.

7. The device of claim 1, wherein the one or more programs further include instructions for:
   detecting selection by the user of a backup icon;
   in response to detecting the user selection of the backup icon, backing up the playback of the user-selected voicemail message by a predefined amount;
   detecting selection by the user of a speed up icon; and
   in response to detecting the user selection of the speed up icon, increasing the playback speed of the user-selected voicemail message.

8. The device of claim 7, wherein the predefined amount is between one and five seconds.

9. The device of claim 7, wherein increasing the playback speed comprises increasing the playback speed by at least 50%.

10. The device of claim 7, wherein the one or more programs further include instructions for:
for a voicemail message being played at an increased playback speed, adjusting the sound frequency or pitch of the playback.

11. A method, comprising:
at a portable electronic device with a touch screen display:
displaying, on the touch screen display, a list of voicemail messages;
detecting a user selection of a respective voicemail message in the list;
in response to detecting the user selection of the respective voicemail message, displaying, on the touch screen display, a progress bar corresponding to the user-selected voicemail message;
playing the user-selected voicemail message, wherein a playback indicator of the progress bar indicates a played portion of the user-selected voicemail message, and wherein the playback indicator is configured to slide in a first direction along the progress bar;
detecting a finger contact on the touch screen display at a location on the progress bar;
detecting, on the touch screen display, continuous movement of the finger contact from the location on the progress bar to a location other than the progress bar, the continuous movement of the finger contact having a component parallel to the first direction and a component perpendicular to the first direction;
in response to detecting the continuous movement, causing the playback indicator to slide along the progress bar from a first position on the progress bar to a second position on the progress bar in accordance with the component of the movement of the finger contact that is parallel to the first direction; and
restarting playback of a portion of the user-selected voicemail message corresponding to the second position on the progress bar.

12. The method of claim 11, further comprising:
detecting a scrolling gesture; and
in response to detecting the scrolling gesture, scrolling the list of voicemail messages.

13. The method of claim 12, wherein the scrolling gesture comprises a vertical movement of a finger of the user on the touch screen display.

14. The method of claim 12, wherein the scrolling gesture has a horizontal position on the touch screen, and detecting the scrolling gesture is independent of the horizontal position of the gesture on the touch screen.

15. The method of claim 11, wherein detecting selection by the user of a respective voicemail message comprises detecting a tap gesture by the finger of the user on the respective voicemail message.

16. The method of claim 11, wherein responding to the user selection of the respective voicemail message includes highlighting the respective voicemail message in the list.

17. The method of claim 11, further comprising:
detecting selection by the user of a backup icon,
in response to detecting the user selection of the backup icon, backing up the playback of the user-selected voicemail message by a predefined amount;
detecting selection by the user of a speed up icon; and
in response to detecting the user selection of the speed up icon, increasing the playback speed of the user-selected voicemail message.

18. The method of claim 17, wherein the predefined amount is between one and five seconds.

19. The method of claim 17, wherein increasing the playback speed comprises increasing the playback speed by at least 50%.

20. The method of claim 17, further comprising:
for a voicemail message being played at an increased playback speed, adjusting the sound frequency or pitch of the playback.

21. A non-transitory computer readable storage medium storing one or more programs, the one or more programs comprising instructions, which when executed by a portable electronic device with a touch screen display, cause the device to:
display, on the touch screen display, a list of voicemail messages;
detect a user selection of a respective voicemail message in the list;
in response to detecting the user selection of the respective voicemail message, display, on the touch screen display, a progress bar corresponding to the user-selected voicemail message;
play the user-selected voicemail message, wherein a playback indicator of the progress bar indicates a played portion of the user-selected voicemail message, and wherein the playback indicator is configured to slide in a first direction along the progress bar;
detect a finger contact on the touch screen display at a location on the progress bar;
detect, on the touch screen display, continuous movement of the finger contact from the location on the progress bar to a location other than the progress bar, the continuous movement of the finger contact having a component parallel to the first direction and a component perpendicular to the first direction;
in response to detecting the continuous movement, cause the playback indicator to slide along the progress bar from a first position on the progress bar to a second position on the progress bar in accordance with the component of the movement of the finger contact that is parallel to the first direction; and
restart playback of a portion of the user-selected voicemail message corresponding to the second position on the progress bar.

22. The computer readable storage medium of claim 21, wherein the instructions further cause the device to:
detect a scrolling gesture; and
in response to detecting the scrolling gesture, scroll the list of voicemail messages.

23. The computer readable storage medium of claim 22, wherein the scrolling gesture comprises a vertical movement of a finger of the user on the touch screen display.

24. The computer readable storage medium of claim 22, wherein the scrolling gesture has a horizontal position on the touch screen, and detecting the scrolling gesture is independent of the horizontal position of the gesture on the touch screen.

25. The computer readable storage medium of claim 21, wherein detecting selection by the user of a respective voicemail message comprises detecting a tap gesture by the finger of the user on the respective voicemail message.

26. The computer readable storage medium of claim 21, wherein responding to the user selection of the respective voicemail message includes highlighting the respective voicemail message in the list.

27. The computer readable storage medium of claim 21, wherein the instructions further cause the device to:
   detect selection by the user of a backup icon;
   in response to detecting the user selection of the backup icon, back up the playback of the user-selected voicemail message by a predefined amount;
   detect selection by the user of a speed up icon; and
   in response to detecting the user selection of the speed up icon, increase the playback speed of the user-selected voicemail message.

28. The computer readable storage medium of claim 27, wherein the predefined amount is between one and five seconds.

29. The computer readable storage medium of claim 27, wherein increasing the playback speed comprises increasing the playback speed by at least 50%.

30. The computer readable storage medium of claim 27, wherein the instructions further cause the device to:
   for a voicemail message being played at an increased playback speed, adjust the sound frequency or pitch of the playback.

\* \* \* \* \*

UNITED STATES PATENT AND TRADEMARK OFFICE
CERTIFICATE OF CORRECTION

PATENT NO.       : 10,033,872 B2
APPLICATION NO.  : 13/172649
DATED            : July 24, 2018
INVENTOR(S)      : Freddy A. Anzures et al.

Page 1 of 1

It is certified that error appears in the above-identified patent and that said Letters Patent is hereby corrected as shown below:

In the Claims

Claim 17, Column 23, Line 63, delete "icon," and instead insert --icon;--.

Signed and Sealed this
Sixth Day of November, 2018

Andrei Iancu
*Director of the United States Patent and Trademark Office*